United States Patent [19]

Okuda

[11] Patent Number: 5,206,726
[45] Date of Patent: Apr. 27, 1993

[54] TIME BASE CORRECTOR FOR ELIMINATING TIME BASE FLUCTUATIONS IN A COMPOSITE VIDEO SIGNAL

[75] Inventor: Yoshiyuki Okuda, Tokorozawa, Japan

[73] Assignee: Pioneer Electronic Corporation, Tokyo, Japan

[21] Appl. No.: 694,412

[22] Filed: May 1, 1991

[30] Foreign Application Priority Data

Jul. 27, 1990 [JP] Japan .................. 2-199879

[51] Int. Cl.$^5$ .............................. H04N 9/89
[52] U.S. Cl. .................... 358/149; 358/158; 358/320; 358/324
[58] Field of Search ............ 358/19, 20, 21, 26, 358/30, 31, 315, 326, 330, 148, 149, 158, 320, 324; 360/36.1, 36.2

[56] References Cited

U.S. PATENT DOCUMENTS

| | | | |
|---|---|---|---|
| 4,733,311 | 3/1988 | Yoshinaka | 358/320 |
| 4,792,845 | 12/1988 | Judge | 358/10 |
| 4,881,121 | 11/1989 | Judge | 358/10 |

Primary Examiner—James J. Groody
Assistant Examiner—Glenton B. Burgess
Attorney, Agent, or Firm—Keck, Mahin & Cate

[57] ABSTRACT

A time base corrector of composite video signal using memory. In the back porch and front porch of a composite video signal, offset voltages having polarities opposite to each other and a level corresponding to the level of a phase error signal are added to the phase error signal and are used as an input signal of a VCO for generating a writing clock. As the result, jitter components which cannot be removed by the PLL only can be eliminated.

3 Claims, 8 Drawing Sheets (a)

(b)

(c)

TIME BASE CORRECTOR FOR ELIMINATING TIME BASE FLUCTUATIONS IN A COMPOSITE VIDEO SIGNAL

BACKGROUND OF THE INVENTION

1. Field of the invention

The present invention relates to a time base corrector for treating a composite video signal.

2. Description of Background Information

FIG. 1 shows a basic type of time base corrector using digital memory. As shown in the figure, a reproduced composite video signal having time base fluctuation (jitter), as read from a recording medium such as a video disk and obtained by demodulation, is supplied to this device The received composite video signal is quantized by an A/D converter in a writing clock generation circuit 1C using a writing clock generated in phase synchronization with the composite video signal as a sampling clock. The composite video signal is then written into a digital memory 3 in synchronism with the writing clock. At the time when the composite video signal is written in memory 3, the correspondence of addresses of memory 3 to data written therein is maintained, so that the influence of time base fluctuation is eliminated. The data written in memory 3 is read in synchronism with the reading clock, generated on the basis of a reference clock having a fixed frequency in a reading clock generation circuit 4 and is converted to analog form by a D/A converter 5.

Thus, by writing the data in digital memory 3 using the writing clock synchronized in phase with the input composite video signal and by reading the stored data from said memory 3 using the fixed reading clock, it is possible to eliminate the time base fluctuation component contained in the input composite video signal.

Explanation is further made on the arrangement and the operation of the writing clock generation circuit 1C.

In the writing clock generation circuit 1C, an output of a VCO 11 (voltage controlled oscillator) to be used as the writing clock is divided at a rate of 1/N through a frequency divider 12 and is supplied to a phase comparator 13. The phase comparator 13 performs the sampling of the phase difference between horizontal synchronizing signal, separated and extracted from the input composite video signal in a horizontal synchronizing separation circuit 6 and the output signal of the frequency divider 12. The sampled value is held until the next sampling time and is issued as a phase error signal. This phase error signal is supplied to a control input of the VCO 11 through an LPF (low pass filter) 14.

By the use of the writing clock generation circuit with a PLL (phase locked loop), the writing clock, i.e. output of the VCO 11, is synchronized in phase with the horizontal synchronizing signal of the input composite video signal and is generated as a clock which follows time base fluctuation of the input composite video signal. Accordingly, it is possible to obtain a composite video signal of which the time base fluctuation is eliminated.

However, in the conventional type writing clock generation circuit as described above, the phase comparator 13 detects the phase error only one time in each period $T_H$ of the horizontal synchronizing signal as shown in FIG. 2, and the error value is held until the next detection time. Thus, the circuit is constructed to have a holding time of $T_H$. Therefore, the error value delayed by the time $T_H$ is produced immediately before the next detection time. By averaging the output signal as a whole, it can be regarded that a delay of $T_H/2$ is generated.

On the other hand, the response bandwidth of the PLL is determined by the bandwidth of the LPF 14 in PLL system and by the loop gain of the entire system. If it is attempted to broaden the bandwidth of the LPF 14 for improving the response characteristic, the stability of the system will be impaired due to the delay $T_H/2$ of the phase comparator 13. So, it is impossible to expand the bandwidth as desired. Thus, it is necessary to limit the bandwidth about one tenth or less of the horizontal synchronizing frequency $f_H$. As the result, a limitation is posed to the follow up capability against the time base fluctuation of the input composite video signal if the phase synchronizing loop only is used, and the performance of time base correction function is limited accordingly.

OBJECT AND SUMMARY OF THE INVENTION

An object of the present invention is to offer a time base corrector, by which it is possible to eliminate the time base fluctuation, which is not removable by the phase locked loop only, and to improve the performance of the time base correction characteristic.

The time base corrector according to the present invention comprises writing clock generating means for generating a writing clock following time base fluctuation of an input composite video signal, and reading clock generating means for generating a reading clock on the basis of a reference signal, whereby said input composite video signal is written in memory in synchronism with said writing clock, and the data written in said memory is read from said memory in synchronism with said reading clock, wherein said writing clock generating means comprises a voltage controlled oscillator, phase difference detecting means for detecting a phase difference between said input composite video signal and an output signal of said voltage controlled oscillator, generating means receiving an output signal of said phase difference detecting means as a control input signal, for generating offset voltages having polarities opposite to each other and a level corresponding to the signal level of said control input signal at predetermined timings in the back porch and the front porch of said input composite video signal, and an adder, using an output signal of said phase difference detecting means as an augend input signal, for adding said offset voltages to said augend input signal, and using a resultant output signal as a control signal of said voltage controlled oscillator.

In the time base corrector of the present invention, offset voltages having polarities opposite to each other and a level corresponding to the signal level of the phase difference signal representing the phase difference of the input composite video signal relative to the output signal of the voltage controlled oscillator are generated at predetermined timings in the back porch and the front porch of the input composite video signal, and the offset voltages are added to the phase difference signal and a signal obtained by the addition is used as a control input signal of the voltage controlled oscillator.

DESCRIPTION OF THE PREFERRED EMBODIMENTS

In the following, the embodiments of this invention will be described in connection with the drawings.

Figure 3:
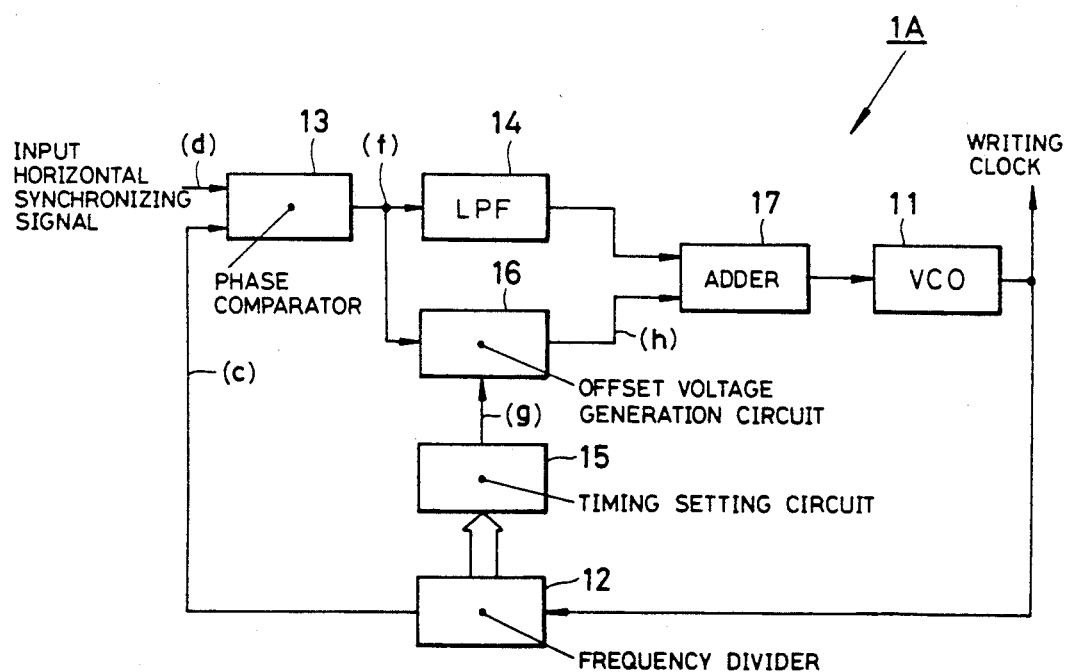
FIG. 3 is a block diagram showing an embodiment of the present invention.

FIG. 3 is a block diagram showing an embodiment of the writing clock generating circuit 1A in the time base corrector according to the present invention. In addition to a phase locked loop (PLL) consisting of a VCO 11, a frequency divider 12, a phase comparator 13 and an LPF 14, the present embodiment comprises a timing setting circuit 15 for issuing a pulse setting signal at predetermined timings in each of the back porch and the front porch of input the composite video signal on the basis of the frequency dividing data at the frequency divider 12, an offset voltage generating circuit 16 for generating offset voltages with polarities opposite to each other in the back porch and the front porch at levels corresponding to a phase error level, i.e. a comparison output of the phase comparator 13, in response to the pulse setting signal from the timing setting circuit 15, and an adder 17 for adding the offset voltages to the phase error signal through LPF 14 and for using the added signal as a control input signal of the VCO 11.

As the phase comparator 13 of the phase locked loop, it is preferable to use a comparator with such an arrangement that the phase difference between the edge of input horizontal synchronizing signal and an internal horizontal synchronizing signal obtained by a 1/N frequency division of the output clock of the VCO 11 by the frequency divider 12 is sampled as a voltage, and the sampled phase difference can be held at 0-th order for a period until the next horizontal synchronizing signal. For example, in the waveform diagram of FIG. 4, it is preferable to use such an arrangement that a ramp function voltage (e) rising from the potential of −2V is generated at timings a short time before the generation of the internal horizontal synchronizing signal (c) which is a frequency division output of the frequency divider 12 in response to a start pulse (b), the ramp function voltage (e) is sampled at leading edges of the input horizontal synchronizing signal (d) and held at 0-th order. In this case, it is advantageous if the start potential and the inclination of the ramp function is set in such manner that the sampled voltage is 0V when the phases of the input horizontal synchronizing signal (d) and internal horizontal synchronizing signal (c) coincide with each other.

As the adder 17, an analog adder for adding two input voltages with 0V as a reference is used. Further, as the VCO 11, it is preferable to use an oscillator with such a frequency linear arrangement that frequency variation is ±2–4% against control voltage of ±2–4V using 0V as a reference. A concrete arrangement of the timing setting circuit 15 will be described later.

Next, description is given on the operation of the writing clock generation circuit 1A with such an arrangement.

Whether it be the currently used format such as the NTSC, PAL, SECAM, etc. or a Hi-Vision format, a horizontal synchronizing signal section and a substantial video signal section are separated timewise in a composite video signal, so that the video signal section is located between a horizontal synchronizing signal and a next horizontal synchronizing signal, and marginal sections are provided on the boundary as the back porch and the front porch. In the present invention, attention is given to the presence of the marginal sections, and the marginal sections are utilized for eliminating the residual jitter, which could not be eliminated by the phase locked loop alone, while preventing influences on the operation of phase locked loop.

Figure 4:
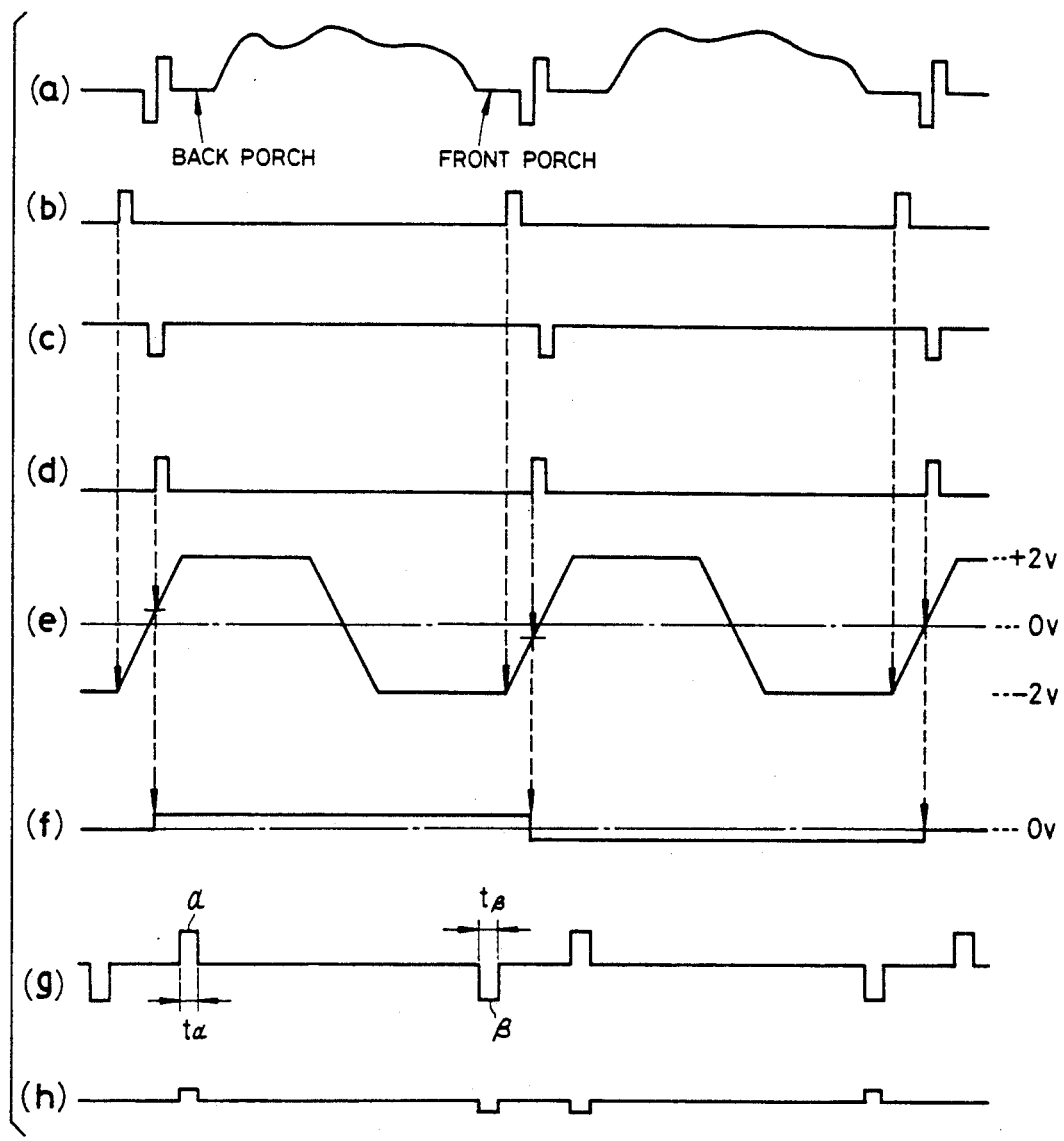
FIG. 4 is a waveform diagram for each portion to explain the operation.

Next, description is given on the circuit operation with reference to FIG. 4 showing the waveform of each portion in a case where the invention is applied to a composite video signal of the Hi-Vision format.

First, in the back porch period of an input composite video signal (a), a pulse setting signal $\alpha$ (g) with a positive polarity having a pulse width $t\alpha$ is issued from the timing setting circuit 15. From an offset voltage generating circuit 16, a pulse-like offset voltage (h) having a polarity corresponding to the polarity of the pulse setting signal $\alpha$ (g) and a level (peak value) corresponding to the level of a 0-th hold voltage (f) by the phase comparator 13 is produced in response to this pulse setting signal $\alpha$ (g). The offset voltage (h) is added to the output of LPF 14 by the adder 17 and is in turn supplied to the VCO 11 as a control input signal. Thus, a phase shift proportional to the 0-th hold voltage (f) is given to the output clock of the VCO 11.

Because this procedure only provides a mere disturbance to the phase locked loop itself, a pulse setting signal $\beta$ (g) having a negative polarity and a pulse width of $t\beta$ ($=t\alpha$) is generated in the front porch period of the input composite video signal (a). By this pulse setting signal $\beta$ (g), the offset voltage (h) having the same absolute value but with a polarity opposite to the previous offset voltage is produced, and the offset voltage is added to the output of the LPF 14 and is in turn used as a control input signal of the VCO 11. Further, by giving the phase shift of a reverse direction to the output clock of VCO 11, the phase of the output clock of the VCO 11 is given back to the original state.

Figure 5:
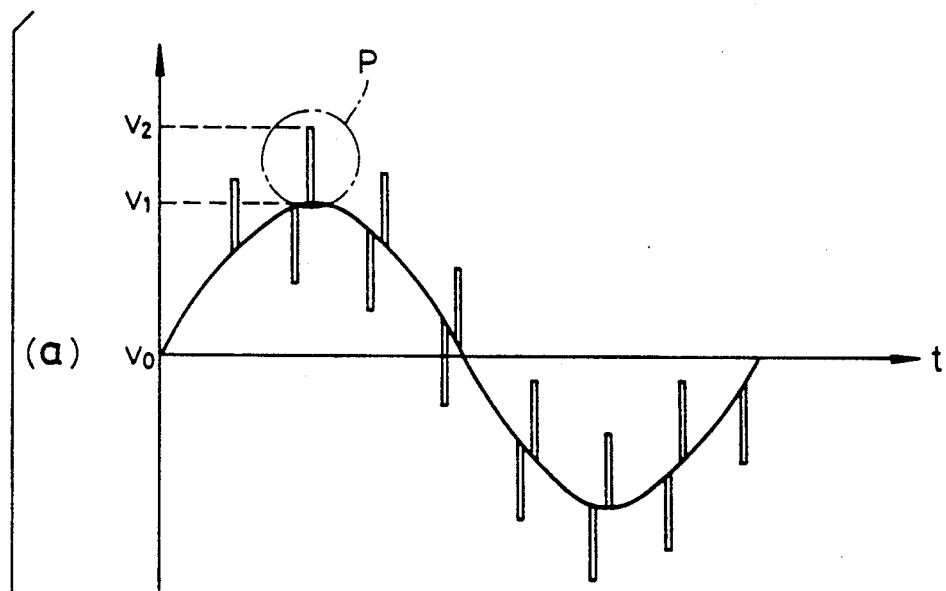
FIG. 5 is a waveform diagram for explaining a phase shift amount and time base shift amount when pulses are applied to the control input of the VCO.
Figure 5:
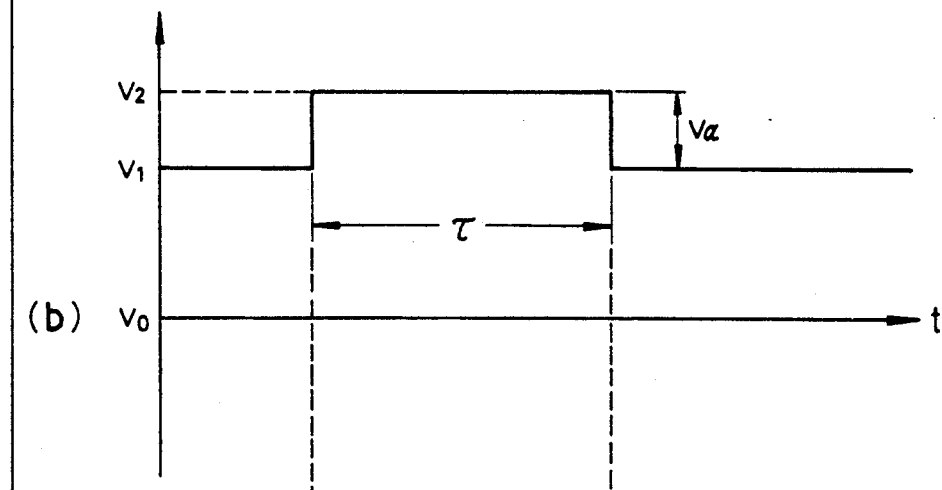
Figure 5:
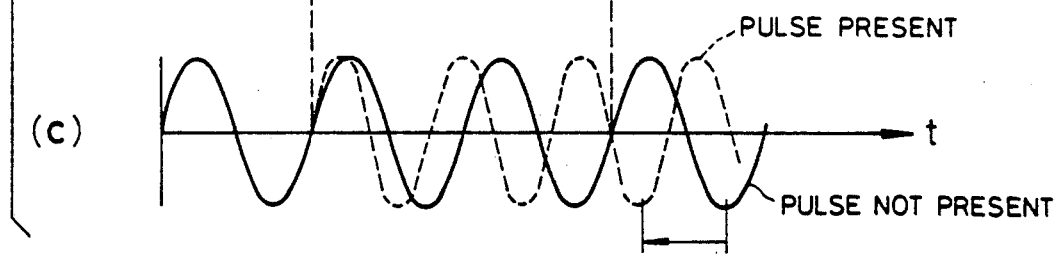

In the waveform diagram of FIG. 5, let us consider in what degree the output pulse of the VCO 11 advances, and as a result what degree of phase shift on time base occurs when a pulse-like offset voltage with pulse width $\tau$ and a peak value $v_d$ as given in FIG. 5 (b) is added to the control input of the VCO 11.

First, it is assumed that the input voltage of the VCO 11 is macroscopically as shown in FIG. 5 (a). In this case, $v_0$ is the input voltage of the VCO 11 corresponding to the output frequency $f_0$ of the VCO 11 when there is no time base fluctuation in the system, and said input voltage is oscillated according to the time base fluctuation around $v_0$. FIG. 5 (b) is an enlarged view of the portion P of this waveform, and the pulse with a pulse width $\tau$ and a peak value $v_d$ is applied. If it is supposed that the input potential on the portion other than pulse is $v_1$, and that the potential of the pulse portion is $v_2$, then $v_2 = v_1 + v_d$. On the other hand, the output frequency of VCO 11 is $f_1$ when the control input is $v_1$ and it assumes $f_2$ when the control input is $v_2$, and $f_2 - f_1 = f_d$. It is assumed that the VCO 11 is such that a linear relation is present between input voltage and output frequency.

Here, it is assumed that the output waveform of the VCO 11 when pulse (offset voltage) is not applied is:

$$v(t) = \sin 2\pi f_1 t$$

and that the phase change in this case is:

$$\phi(t) = 2\pi f_1 t$$

On the other hand, the output waveform of VCO 11 when pulse is applied is assumed to be:

$$\begin{aligned} v'(t) &= \sin 2\pi f_2 t \\ &= \sin 2\pi (f_1 + f_d) t \end{aligned}$$

and the phase change in this case is assumed to be:

$$\phi'(t) = 2\pi f_2 t = 2\pi (f_1 + f_d) t$$

Therefore, the phase shift amount $\Delta\phi$ at the end of pulse as a result of the application of the pulse is:

$$\begin{aligned} \Delta\phi &= \phi'(\tau) - \phi(\tau) \\ &= 2\pi (f_1 + f_d)\tau - 2\pi f_1 \tau \\ &= 2\pi f_d \tau \end{aligned}$$

Figure 1:
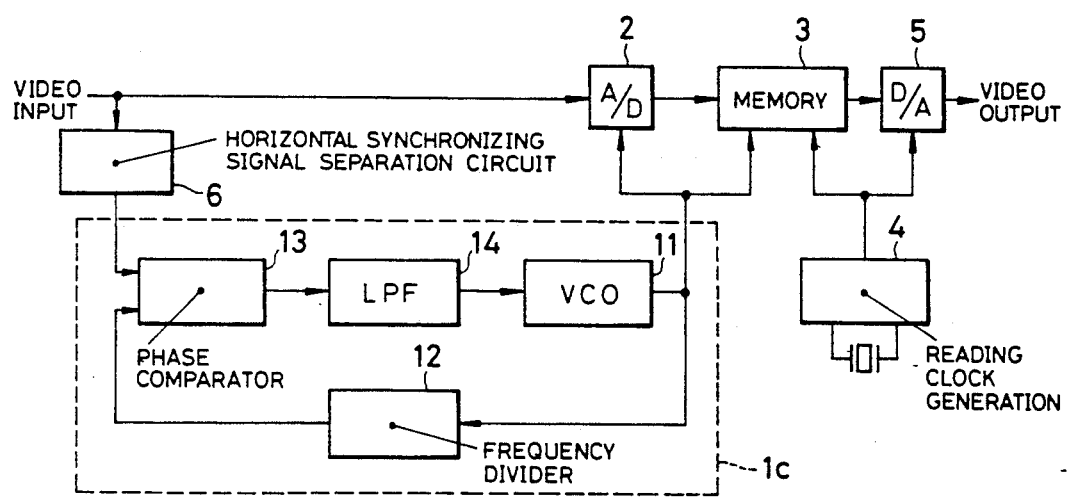
FIG. 1 is block diagram showing a conventional example.
Figure 2:
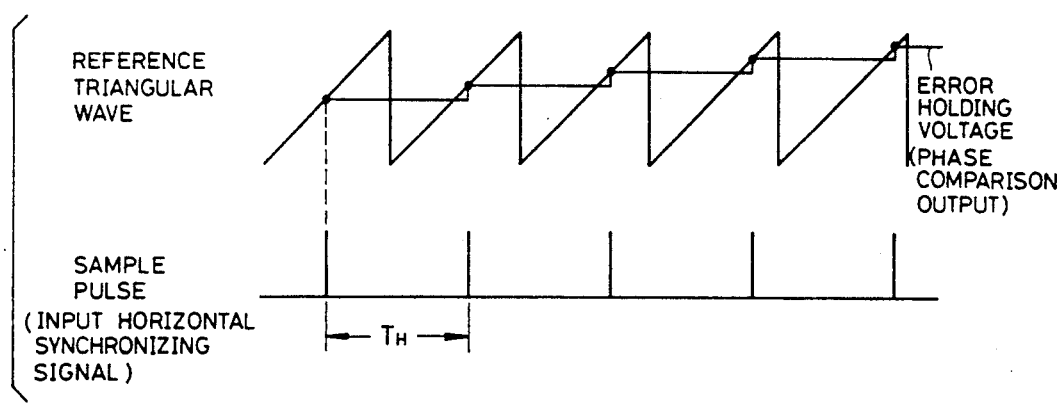
FIG. 2 is a waveform diagram for explaining the operation of the phase comparator shown in FIG. 1.

In other words, as shown in FIG. 5 (c), relative to the waveform (solid line) when pulse is not applied, the waveform (dotted line) when pulse is applied has a phase advance of $9\pi f_d \tau$. Also, the time base shift amount $\Delta t$ converted by A/D converter 2 (See FIG. 1.) corresponds to the phase shift amount $\Delta\phi$ on time dimension when sampling is continued at the center clock $f_0$. Therefore, $$\Delta t = \Delta\omega / 2\pi f_0 = (f_d / f_0) \cdot \tau$$

In this way, offset voltages (h) are generated with polarities opposite to each other and a peak value corresponding to the level of sample hold signal (f) based on the phase difference between the input horizontal synchronizing signal (d) and the internal horizontal synchronizing signal (c), and these offset voltages (h) are added to sample hold signal (f) and are used as control input of VCO 11. Then, phase shift is performed by feeding forward residual jitter within the time when phase comparator 13 is at pre-hold, and the phase can be returned to initial state before the completion of the pre-hold. Accordingly, the jitter correction bandwidth is substantially expanded, and the jitter not removable by the phase locked loop only can be eliminated, and this contributes to the improvement of the performance of time base correction operation.

To eliminate the jitter which cannot be removed by phase locked loop alone, phase shifter for phase-shift of the output clock of VCO 11 may be added outside the VCO 11, or a method of controlling the phase of the reading clock from digital memory 3 may be adopted, whereas this may lead to the complication of the entire system or to the difficulty of phase shift of more than 360° in case of phase shifter. According to the present invention, in contradistinction, the circuit configuration is very simple and the frequency of the VCO 11 itself can be controlled, and a phase shift of 360° or more can be achieved.

Figure 6:
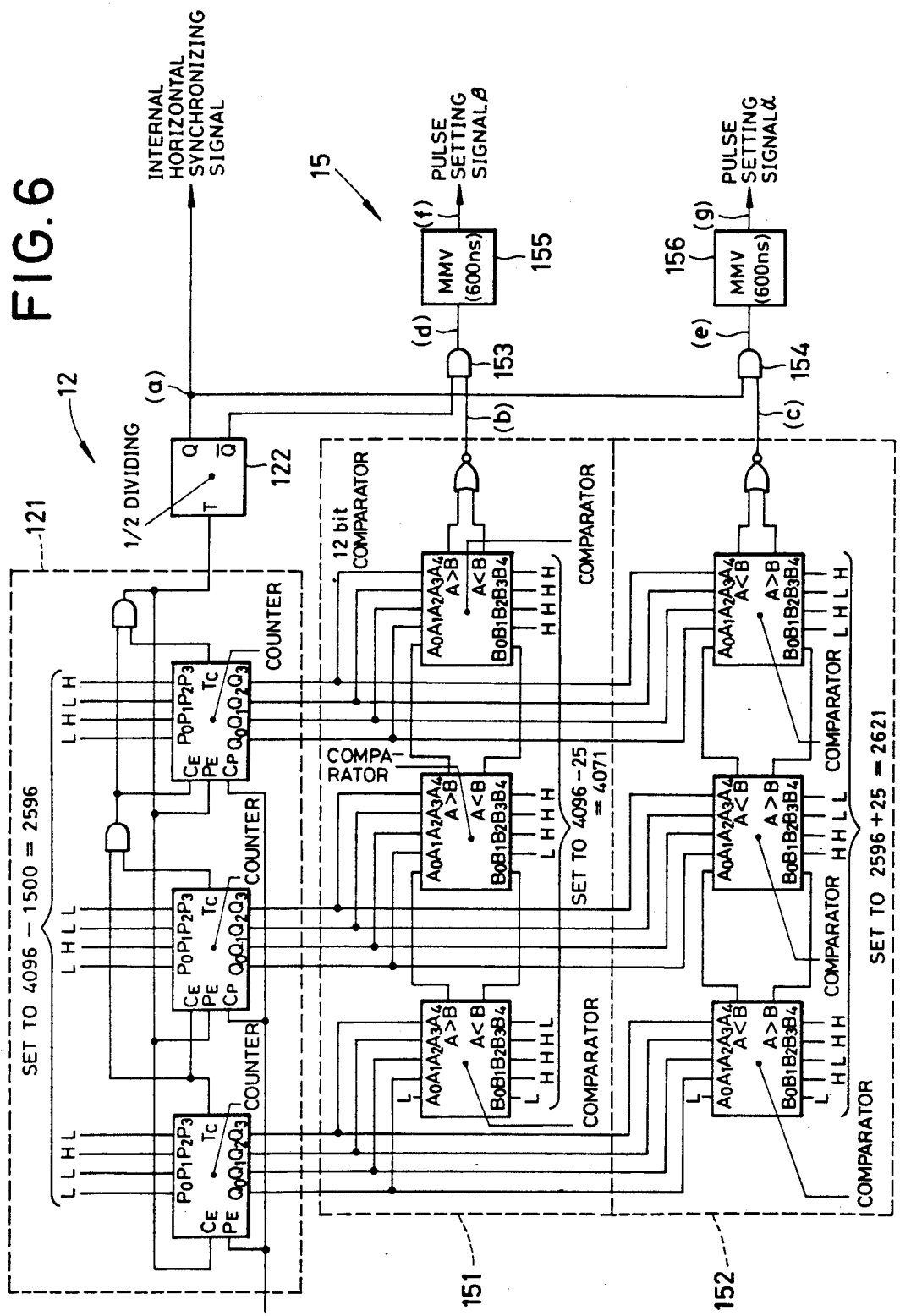
FIG. 6 is a block diagram showing a concrete example of the arrangement of frequency divider and timing setting circuit.
Figure 7:
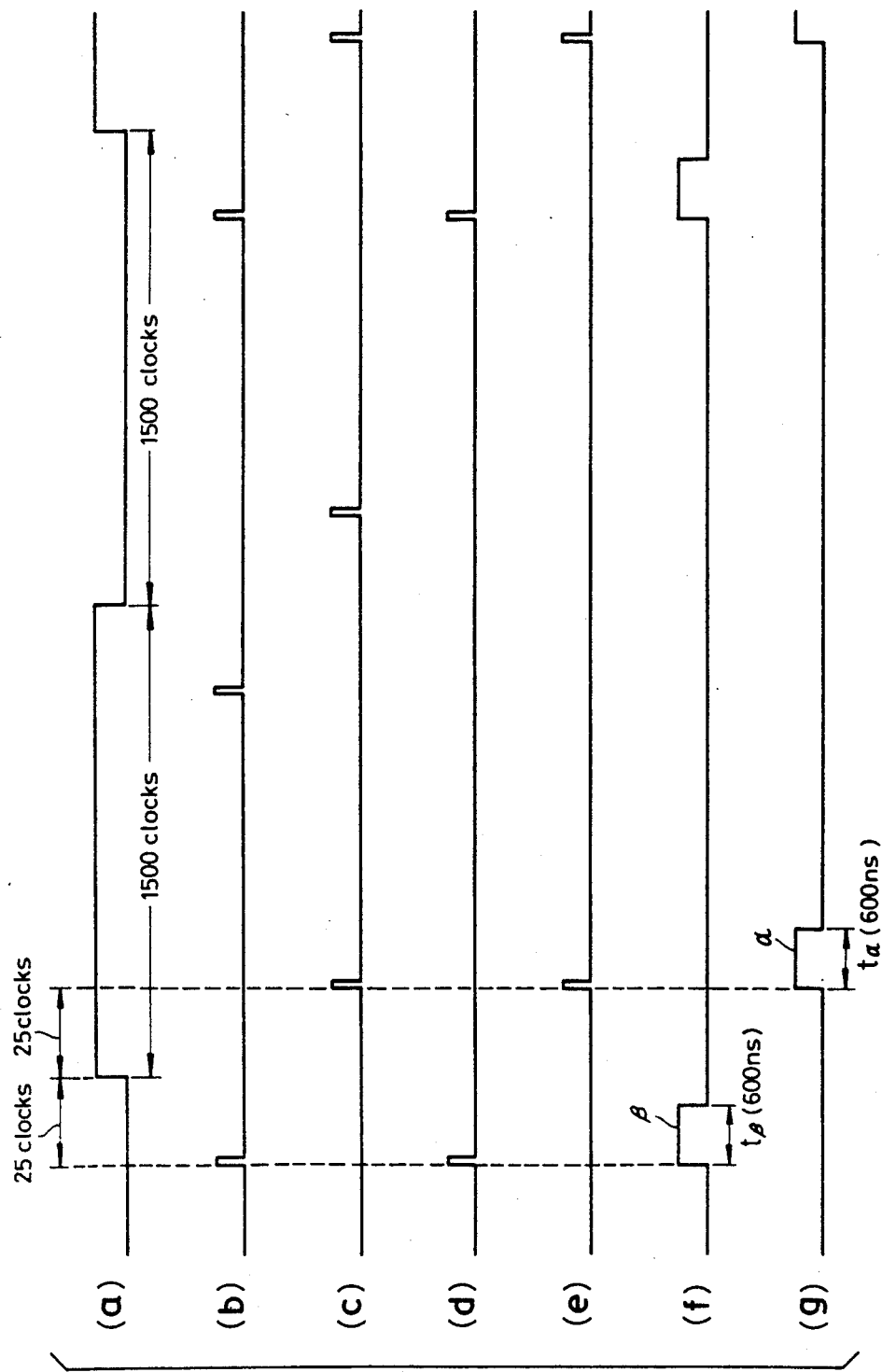
FIG. 7 is a waveform diagram showing signals at various portions for explaining the operation of the circuit.

Next, description is given on the timing setting circuit 15, referring to FIG. 6 showing an example formed integrally with the frequency divider 12 and FIG. 7 showing waveforms of various portions thereof. This exemplifies a case in which a composite video signal of Hi-Vision format assumes the following conditions: the period of the reference horizontal synchronizing signal (a) is 3000 clock, the duty ratio is 50%, and the front edges of the pulse setting signal $\beta$ (f) and pulse setting signal $\alpha$ (g) are set at points 25 clocks before and after the rising of the reference horizontal synchronizing signal (a).

In FIG. 6, the frequency divider 12 consists of a counter 121, which provides 12-bit dividing by three 4-bit counters on 1500 dividing, and a T-FF (flip-flop) 122 for dividing this counter output at a rate of ½, and Q output of the T-FF 122 is used as internal horizontal synchronizing signal (a). On the other hand, the timing setting circuit 15 comprises a 12-bit comparators 151 and 152 each consisting of three 5-bit comparators, an AND gate 153 receiving the output (b) of the comparator 151 and $\overline{Q}$ output of the T-FF 122 as two input signals, an AND gate 154 receiving the output (c) of the comparator 151 and Q output of T-FF 122 as two inputs, and MMVs (monostable multivibrators) 155 and 156 receiving the outputs (d) and (e) of these AND gates 153 and 154 as trigger input signals respectively. The outputs (f) and (g) of MMVs 155 and 156 are used as pulse setting signals $\beta$ and $\alpha$.

Figure 8:
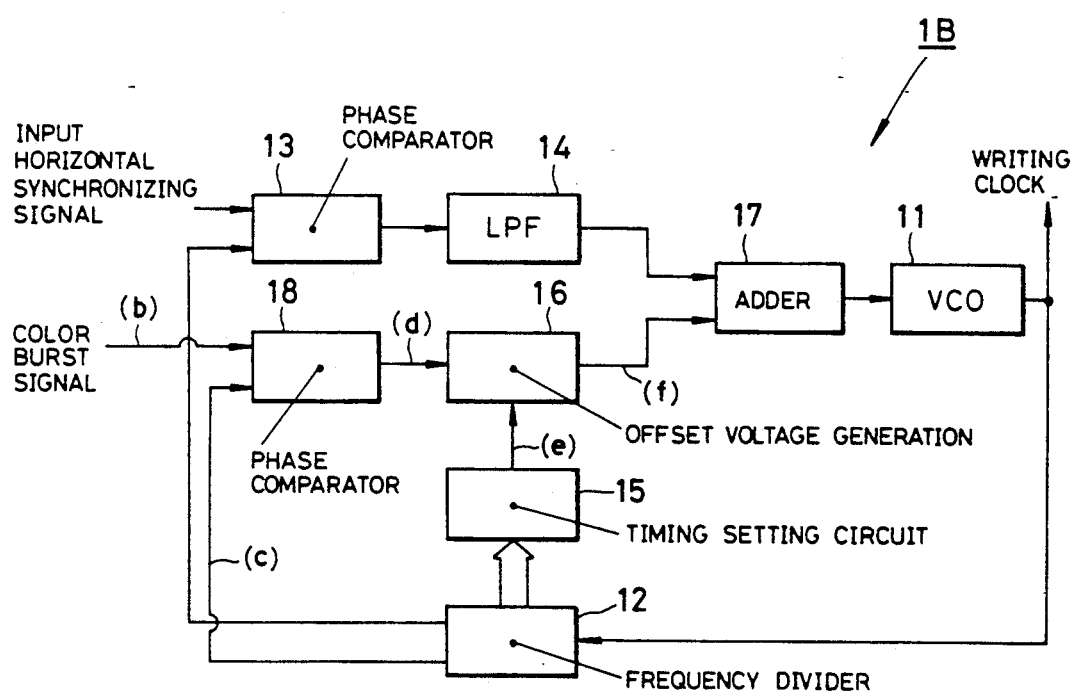
FIG. 8 is a block diagram of another embodiment of this invention.

FIG. 8 is a block diagram showing another embodiment of this invention, in which the same components as in FIG. 3 are denoted by the same symbols. This embodiment is to be used for treating a composite video signal where two types of time base error detection signals including horizontal synchronizing signal and color burst signal are present within the horizontal blanking period just as the composite video signal of the currently used format such as the NTSC, PAL, etc., and the difference from the previous embodiment is that the phase comparator for the phase locked loop and the phase comparator for determining the phase shift amount are provided independently from each other. Namely, the phase comparator 13 for the phase locked loop operates with the horizontal synchronizing signal, and a phase comparator 18 for the phase shift operates with the color burst signal.

Figure 9:
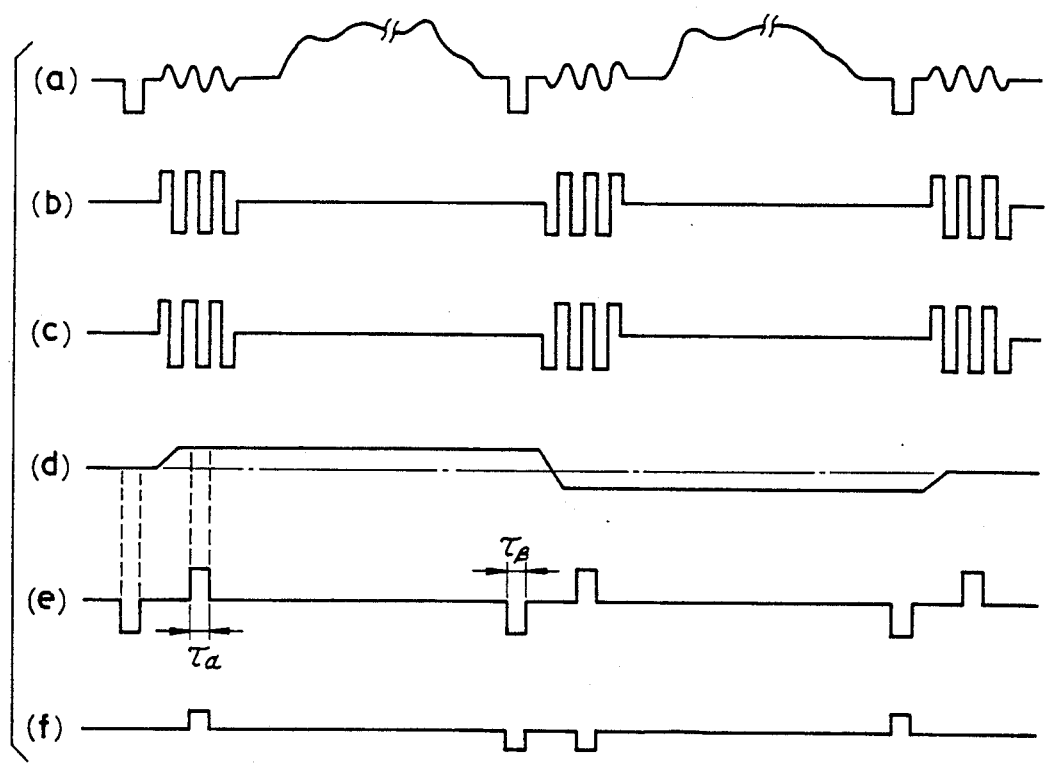
FIG. 9 is a waveform diagram showing signals at various portions for explaining the operation of the embodiment.

In the writing clock generating circuit 1B having such a construction, the operation of the phase locked loop is the same as the previous embodiment. Therefore, explanation is made only on the circuit operation of the different components with reference to FIG. 9 showing waveforms at various circuit portions.

Figure 10:
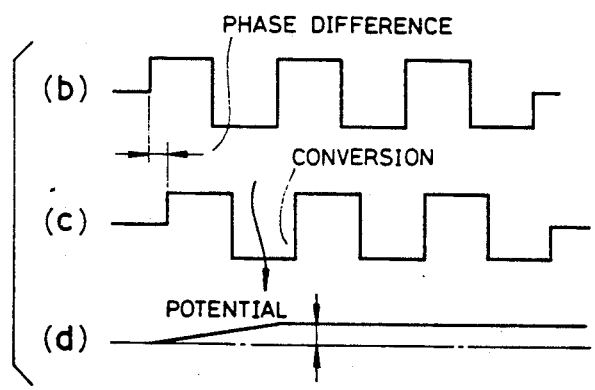
FIG. 10 is an enlarged view showing a major part of the waveform in FIG. 9.

The phase comparator 18 for the phase shift samples the phase difference between the input color burst signal (b) which is obtained by the separation and extraction from the input composite video signal (a) and the internal color burst signal (c) which is obtained by dividing the output pulse of VCO 11 by the frequency divider 12, and this sample hold signal (d) is issued as phase difference signal. Specifically, as it is evident from the enlarged waveform diagram of FIG. 10, the phase difference of leading edges of the input color burst signal (b) and the internal color burst signal (c is converted into a potential difference, and the potential difference is held until the next sampling, and is provided as the sample hold signal (d). This sample hold signal (d) is supplied to the offset voltage generation circuit 16. The offset voltage generation circuit 16 produces a pulse-like offset voltage (f) of the polarity and level (peak value) corresponding to the level of the sample hold signal (d) by the phase comparator 18 in response to the pulse setting signal (e) generated in the timing setting circuit 15.

Since the color burst signal is used to determine the phase shift amount, 10 waves or more of the color burst signal are used for the detection of phase difference. Therefore, in detecting the phase error between the input color burst signal (b) and the internal color burst signal (c), the accuracy in error detection is increased by averaging the phase error of a plurality of waves. As the result, residual time base error which could not be removed by the phase locked loop can be satisfactorily eliminated.

In the above embodiments, description has been given to cases where the invention is applied to the time base corrector using digital memory, whereas similar effect can be obtained by using analog memory using switched capacitors. Accordingly, the writing clock generation circuit having exactly the same arrangement can be used.

Also, in the above embodiments, an offset voltage of the pulse wave (rectangular wave) form is applied to the control input of the VCO 11 for the phase shift of the output clock of VCO 11 in the back porch and for returning the phase in the front porch. However, this offset voltage is not limited to the pulse wave form, and triangular wave, sine wave, etc. may be used.

As described above, in the time base corrector according to the present invention, offset voltages with polarities opposite to each other are generated at the level corresponding to the signal level of the phase difference signal between the input composite video signal and the output signal of the VCO at predetermined timings in the back porch and the front porch of the input composite video signal, and these offset voltages are added to the phase difference signal and the resultant signal is used as a control input signal of the VCO. As the result, it is possible to eliminate the time base fluctuation, which is not removable by the phase locked loop only, and this contributes to the improvement of the performance of time base correction.

What we claim is:

1. A time base corrector, comprising writing clock generating means for generating a writing clock following time base fluctuation of an input composite video signal, and reading clock generating means for generating a reading clock based on a reference signal, means for coupling said input composite video signal to a memory for writing said input composite video signal in said memory in synchronism with said writing clock, and data stored in said memory being read from said memory in synchronism with said reading clock, wherein said writing clock generating means comprises:
   a voltage controlled oscillator;
   phase difference detecting means for detecting a phase difference between said input composite video signal and an output signal of said voltage controlled oscillator;
   means, receiving an output signal of said phase difference detecting means as a control input signal, for generating offset voltages having polarities opposite to each other and a level corresponding to a signal level of said control input signal at predetermined timings in a back porch and a front porch of said input composite video signal; and
   an adder using the outer signal of said phase difference detecting means as an augend input signal, for adding said offset voltages to said augend input signal, and using a resultant output signal as a control input signal of said voltage controllled oscillator.

2. A time base corrector according to claim 1, wherein said phase difference detecting means comprises a phase comparator for comparing phases of a horizontal synchronizing signal in said input composite video signal and a dividing signal of said output signal of said voltage controlled oscillator, and a comparison output signal of said phase comparator is used as said control input signal and said augend input signal.

3. A time base corrector according to claim 1, wherein said phase difference detecting means comprises a first phase comparator for comparing phases of a horizontal synchronizing signal in said input composite video signal and a dividing signal of said output signal of said voltage controlled oscillator, and a second phase comparator for comparing phases of a color burst signal in said input composite video signal and a dividing signal of said output signal of said voltage controlled oscillator, a comparison output signal of said first phase comparator is used as said augend input signal, and a comparison output signal of said second phase comparator is used as said control input signal.

* * * * *